US009801081B2

(12) United States Patent
Gil et al.

(10) Patent No.: US 9,801,081 B2
(45) Date of Patent: Oct. 24, 2017

(54) ADAPTIVE COMMUNICATION FOR MOBILE ROUTER SYSTEMS

(71) Applicant: Massachusetts Institute of Technology, Cambridge, MA (US)

(72) Inventors: Stephanie Gil, Pomona, NY (US); Swarun Suresh Kumar, Cambridge, MA (US); Dina Katabi, Cambridge, MA (US); Daniela Rus, Weston, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 174 days.

(21) Appl. No.: 14/923,953

(22) Filed: Oct. 27, 2015

(65) Prior Publication Data

US 2016/0119798 A1 Apr. 28, 2016

Related U.S. Application Data

(60) Provisional application No. 62/069,496, filed on Oct. 28, 2014.

(51) Int. Cl.
| | |
|---|---|
| *H04L 12/26* | (2006.01) |
| *H04W 24/02* | (2009.01) |
| *H04W 64/00* | (2009.01) |
| *G01S 13/90* | (2006.01) |
| *H04W 24/08* | (2009.01) |
| *G01S 3/46* | (2006.01) |

(52) U.S. Cl.
CPC ......... *H04W 24/02* (2013.01); *H04W 64/003* (2013.01); *G01S 3/46* (2013.01); *G01S 13/90* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2008/0117927 | A1* | 5/2008 | Donhauser | H04L 45/60 370/412 |
| 2009/0185538 | A1* | 7/2009 | Choi | H04W 8/02 370/331 |
| 2013/0329598 | A1* | 12/2013 | DiFazio | H04W 64/003 370/254 |
| 2014/0269526 | A1* | 9/2014 | Mitola, III | H04W 72/12 370/329 |
| 2014/0365488 | A1* | 12/2014 | Arslan | G01S 5/0242 707/736 |
| 2015/0004974 | A1* | 1/2015 | Karimi-Cherkandi | H04W 48/16 455/435.2 |
| 2015/0373701 | A1* | 12/2015 | Furuichi | H04W 16/32 370/329 |

* cited by examiner

*Primary Examiner* — Otis L Thompson, Jr.
(74) *Attorney, Agent, or Firm* — Occhiuti & Rohlicek LLP

(57) ABSTRACT

An approach to adaptively positioning a set of mobile routers to provide communication services to a set of clients makes use of estimated direction profiles of communication between routers and clients. The approach does not rely on a Euclidean model in which communication characteristics (e.g., signal strength, data rate, etc.) depend on distance between communicating nodes, and does not necessarily require sampling of communication characteristics in unproductive directions in order to move the routers to preferable locations.

37 Claims, 8 Drawing Sheets

ADAPTIVE COMMUNICATION FOR MOBILE ROUTER SYSTEMS

CROSS-REFERENCE TO RELATED APPLICATIONS

This application claims the benefit of U.S. Provisional Application No. 62/069,496 filed Oct. 28, 2014, which is incorporated herein by reference.

STATEMENT AS TO FEDERALLY SPONSORED RESEARCH

This invention was made with Government support under Contract No. FA8721-05-C-0002 awarded by the U.S. Air Force and under Grant No. W911NF-08-2-0004 awarded by the Army Research Laboratory. The Government has certain rights in the invention.

BACKGROUND

This invention relates to adaptive communication for mobile router systems.

Providing radio communication services to a distributed set of clients can be challenging in the face of these clients moving in an environment and/or requiring varying communication capacity over a wireless medium, for example, for radio frequency communication over the air. One approach is to use a set of movable "routers" and to position those routers to satisfy the client requirements, or at least to approach full satisfaction of those requirements in a best possible manner according to an overall cost function that depends on the degrees to which the clients' requirements are satisfied.

In this description, the references to "routers" should be understood broadly as devices that route communication, without implication that they perform any particular type of processing or that they operate at any particular layer of a communication protocol stack. For example, in certain example that addresses wireless radio frequency data communication, the described routers function as WiFi access points (or repeaters) functioning at layer 2, and in other embodiments, the also router perform layer 3 functions. However, it should be understood that no particular processing of communication is essential for a device providing communication services to be considered to be a "router". Similarly "client" should be understood broadly to be a communication node in communication with the router. For example, a client may be a computer, smartphone, or other fixed location or mobile device.

Examples in which positioning mobile routers can be important is in swarm robotic systems, which perform many complex tasks through coordination, such as cooperative search of an environment, consensus, rendezvous, and formation control. For example, Google's Project Loon, Facebook's Connectivity Lab, and similar projects envision using a network of controllable routers to provide wireless communication infrastructure in remote areas of the world. Beyond simply maintaining connectivity, reliable communication may include supporting heterogeneous and possibly time-varying communication rates amongst different pairs of agents. For example, some agents may need to use the network for transmitting video while others may simply wish to transmit status information.

The general problem of optimal placement of routers to service a set of spatially distributed clients has been address in previous work in Multi-Robot Coordination. Past work on this topic includes two classes of approaches.

The Euclidean Disk Model approach employs Euclidean disk assumptions where signal quality is assumed to be deterministic and mapped perfectly to the Euclidean distance between the communication nodes. A Euclidean metric allows for quadratic cost for the edges of the network and enables a geometric treatment of an otherwise complex problem. However, this approach can be limited because, in reality, signal strength suffers from large variations over small displacements.

More recently, efforts have focused on giving the communication quality over each link in the network a more realistic treatment by sampling the signal strength and building closed-loop controllers using this feedback. Stochastic Sampling Methods includes methods that either supplement theoretical models for signal strength with a stochastic component based on the collected samples, or use the collected samples to design stochastic gradient controllers However, in general, these approaches suffer inefficiencies associated with sampling, and associated router movement, needed to estimate the gradient, and suffer from local minimum problems inherent with such gradient approaches.

In other domains, direction of arrival information has been estimated for wireless clients using a variation of a Synthetic Aperture Approach, for example, as described in International (PCT) Patent Pub. WO2015/100237, titled "LOCALIZATION WITH NON-SYNCHRONOUS EMISSION AND MULTIPATH TRANSMISSION," which is incorporated herein by reference. However, this or other approaches to acquiring direction or arrival information have not been applied to the problem of positioning mobile routers.

SUMMARY

In a general aspect, an approach to adaptively positioning a set of mobile routers to provide communication services to a set of clients does not rely on a Euclidean model in which communication characteristics (e.g., signal strength, data rate, etc.) depend on distance between communicating nodes, as is assumed in general in Euclidean Disk Model approaches. Furthermore, one or more embodiments of the approach do not require sampling of communication characteristics in unproductive directions in order to move the routers to preferable locations as is done in certain Stochastic Sampling approaches.

In another aspect, in general, a method for adaptively locating a set of mobile routers provides wireless communication services to a plurality of clients. The method includes, at a first mobile router of the set of mobile routers, for each client of a set of clients of the plurality of clients that are in wireless communication with the first router, (a) determining a direction profile characterizing direction-dependence of one or more signal paths between the first router and the client, and determining using the direction profile directional information comprising at least one or a communication direction between the router and the client and a spread of the direction profile, (b) computing a deficiency in communication service associate with the client and the first router, and (c) providing the directional information and the deficiency in communication for determining a location for the first router. The determined location for the first router is then used to adapt the location of said router. In some examples, the router is caused to travel toward the determined location. This method can be performed at each mobile router of the set of mobile routers, and performed repeatedly to repeatedly update the location.

In another aspect, in general, software stored on a non-transitory machine readable medium includes instructions that when executed on a processor of a mobile router cause the processor to perform the method.

In another aspect, in general, software stored on non-transitory machine-readable media cause multiple processors, including processors of the mobile routers, to act together to adaptively updated locations of the set of mobile routers.

In another aspect, in general, a mobile router is configured to perform adaptively update its location according to a method specified above. In some examples, the mobile router comprises at least one of a robot, an unmanned vehicle, and aerial vehicle.

Other features and advantages of the invention are apparent from the following description, and from the claims.

DESCRIPTION

Figure 1:
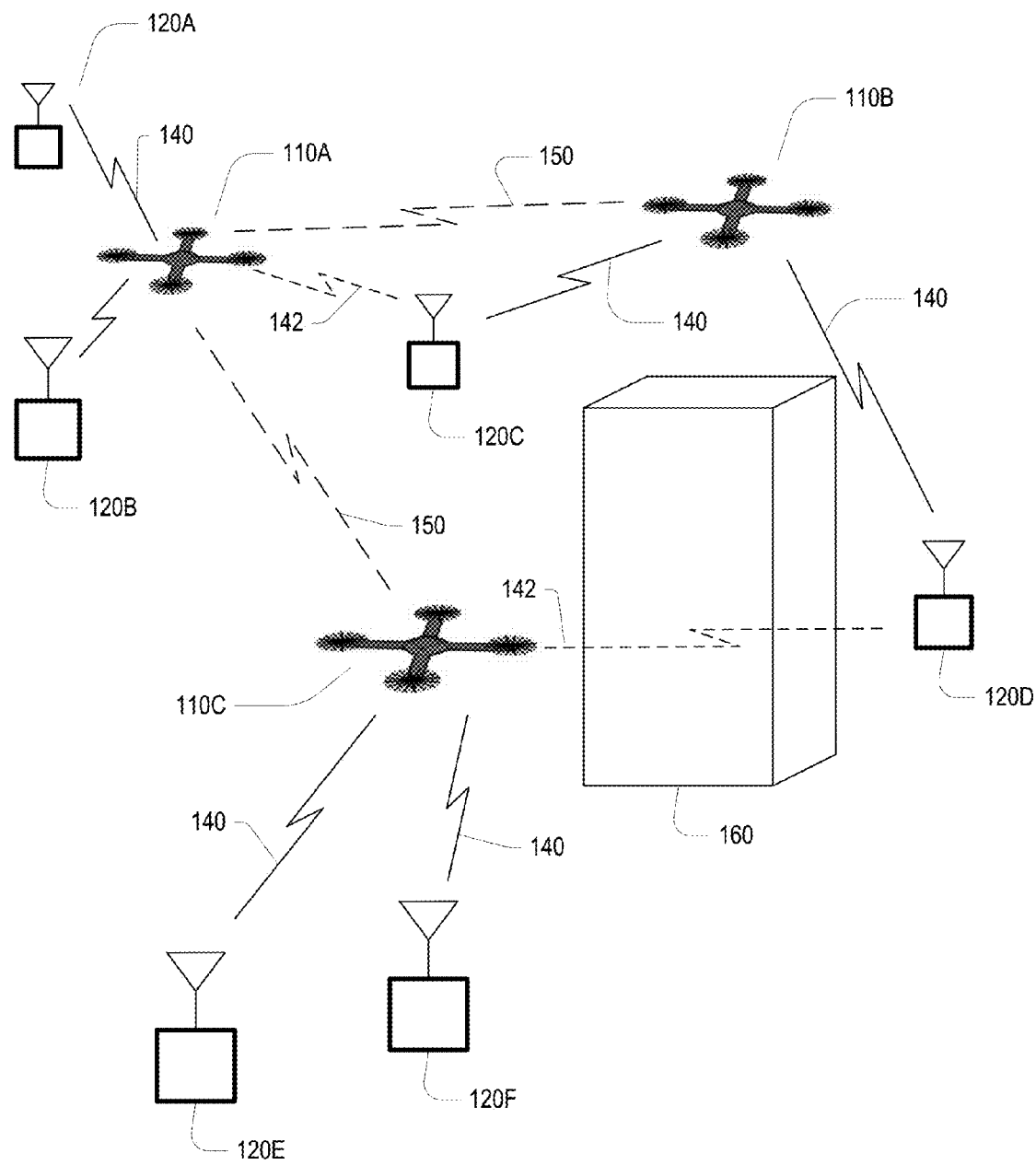
FIG. 1 is a schematic diagram illustrating mobile routers providing communication services to spatially distributed clients.

Referring to FIG. 1, in an example of application of one or more embodiments described below, a set of mobile routers 110A-C provide communication services to a set of clients 120A-E. In the example illustrated in FIG. 1, the mobile routers are aerial vehicles (e.g., multi-rotor aircraft (e.g., "quadcopters"), balloons, fixed wing aircraft, low earth orbit satellites, etc.), which communicate among one another along radio links 150 and communicate with clients along radio links 140. In the illustration a representative obstruction 160 (e.g., a building) inhibits communication between certain routers and clients (e.g., between router 120C and client 120D). As a result of such obstructions, and for other reasons, communication capacity between router-client pairs does not depend solely on Euclidean distance between them. In this example, at any time, each client is associated with a particular router (e.g., client 120C is associated with router 110B), in this examples, other routers may communicate with a client (e.g., router 110A with client 120C over a communication path 142). In operation, locations of the routers 120A-C, and association of clients with routers, is controlled to improve overall communication service to the clients according to a criterion discussed below. This control reacts to changes in client locations, changes in capacity requirements by clients, and/or changes in link capacities, for example, resulting from changing environmental conditions.

It should be understood that in the example shown in FIG. 1 the routers operate in three dimensions. However, equivalent approaches are applicable in two dimensions. Furthermore, for the sake of exposition, two-dimensional embodiments are presented below with the understanding that the manner of modification to three dimensions is evident from this Description. Also, the approaches are not limited to radio frequency techniques. For example, freespace optical communication, and acoustic communication (e.g., in the air or underwater), can be addressed using the techniques described herein. Also the nature of the communication passing between the clients and routers is not critical. For example, the approach can applied to voice (e.g., for mobile telephones), multimedia, or other data communication.

In some embodiments, the overall quality of communication service is based on the service that can be provided to a particular client j by a particular router i. (To aid in the exposition below, in general, routers are index by the letter i and clients are indexed by the letter j). For a pair of nodes (i, j) the following real quantities relate to the service that can be provided between the nodes:

$q_j > 0$ represents the demanded service (e.g., required data rate, quality) by client j. As introduced above, time dependence is not explicity indicated.

$\rho_{ij} > 0$ represents the available service to the client j from the the router i, for example, representing the Effective Signal to Noise Ratio (ESNR), which has a direct mapping to data rate.

$\max((q_j - \rho_{ij}), 0) \geq 0$ is the service deficiency if client j is serviced by router i.

$0 \leq \max((q_j - \rho_{ij})/q_j, 0) \leq 1$ is the fractional service deficiency if client j is serviced by the the router i.

$\alpha_j 0$ is an "importance" of client j.

$0 \leq w_{ij} = \max(\alpha_j(q_j - \rho_{ij})/q_j, 0) \leq \alpha_j$ is the importance weighted fractional service deficiency Given the importance weighted fractional service deficiencies, an overall "max-min" cost is defined as $G = \max_j(\min_i w_{ij})$ As introduced above, a goal is to reduce or minimize G by controlling the locations of the routers:

$c_i \in \mathbb{R}^d$ (in d—dimensional space) is position of the ith router.

$C = (c_1, c_2, \ldots, c_K)$ is the tuple of locations of K robots. We assume that the locations of the routers are known a central controller of the system. As with other quantities, the time-dependence of these locations is in general omitted unless necessary to the understanding of the notation. Similarly, the locations of the clients is represented as $p_i \in \mathbb{R}^d$ (in d—dimensional space) is position of the jth client.

$P = (p_1, p_2, \ldots, p_L)$ is the tuple of locations of L clients. In some embodiments, the locations of the clients are known a central controller of the system. In other embodiments, locations of the clients are inferred as discussed more fully below. As with other quantities, the time-dependence of these locations is in general omitted but should be understood.

Another property of the system in a particular configuration relates to the directional characteristics communication between a particular client j by a particular router j. In general, in free space with no obstruction, reflections, or other factors that affect signal quality or propagation (e.g., attenuating walls, etc), the router would expect the signal from the client to be arriving in a direction $\theta^{dir}$ in the vector direction of $p_j - c_i$. However, in the presence other factors a router may observe a direction-dependent signal strength, which may or may not have a peak in the $\theta^{dir}$ direction, and that may also have multiple peaks, for example, due to multipath effects in the environment, with the direct path not necessarily corresponding to the strongest peak. As discussed below, for each a router-client pair (i, j) the following, the system maintains a direction estimate of $f_{ij}: [-\pi, \pi] \to \mathbb{R}$, which is a function that maps direction from the client to the router to a positive real quantity. In some instances, this function is referred to below as the "direction profile", and a normalized version is scaled to unit area such that $\hat{f}_{ij}(\theta) = (1/F) f_{ij}(\theta)$ where $F = \int_{-\pi}^{\pi} f_{ij}(\theta) d\theta$.

In various embodiments as described below, each such directionality function can be characterized by $\theta_{ij}^{max}$ which is an estimate of the direction to the client, for example, at the maximum of $f_{ij}(\theta)$; and $0 \leq \rho_{ij} \leq 1$, which is a measure spread of $f_{ij}(\theta)$, or the certainty of the estimate $\theta_{ij}^{max}$, as the direction to the client Approaches to computing $f_{ij}$ and the characterizing quantities $\theta^{max}$ and $\rho$ are described fully below.

A number of related embodiments are described below to solve the problem for updating the desired locations of the routers. Based on information known at time t, including the current positions of the routers C(t), the system determines desired new locations for the routers, C*. These approaches are outlined below, and explained more fully later in this document.

Figure 2:
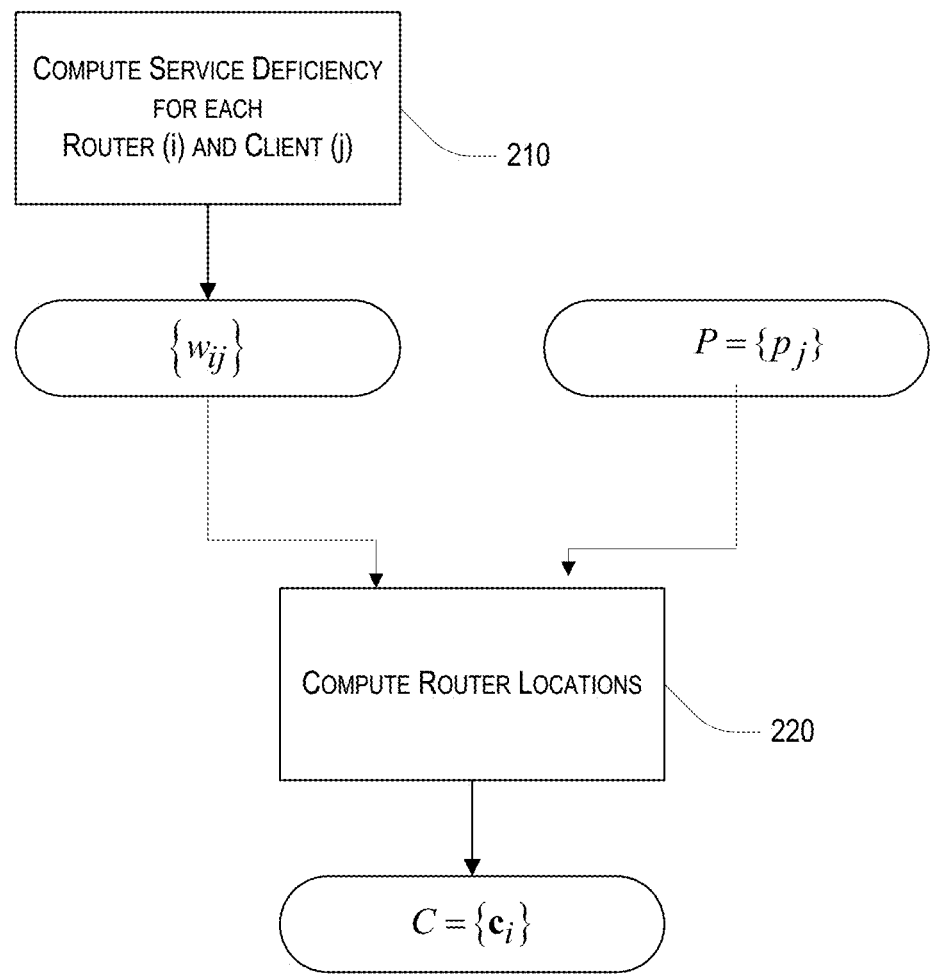
FIGS. 2-4 are flowcharts illustrating a first, a second, and a third approach, respectively, to updating router locations.

Referring to FIG. 2, a first approach to updating the router locations uses the Euclidean distances weighted by the importance weighted fractional service deficiency, $w_{ij}$, terms, which are determined in a service deficiency computation 210. These computations may be distributed among the routers, for example, with each router i computing terms involving that router. It should be understood that the computations shown in FIG. 2 may be distributed, or may be centralized, for example, at a node in communication with the routers (e.g., one of the routers or another type of node on the communication backbone of the routers). A router computation 220 then determines the a new tuple of locations as $$C^* = \arg\min_C \{\max_{p_j \in P(t)} \min_{c_i \in C} (w_{ij}^2 \|p_j - c_i\|^2)\} \quad (1)$$

in which the minimization over C is over all tuples $C = (c_1, c_2, \ldots, c_K)$ of joint router locations, and the minimization over $c_i \in C$ is effectively the assignment of the router to service the $j^{th}$ client. In at least some implementations, this computation is performed at a single node to which the required quantities (e.g., the locations of the routers and clients, and the service deficiencies) have been communicated.

The solution to the optimization of equation (1) is a variant of the well known and studied "K-centers" problem (also referred to as the "Facility Location" problem), which in its optimal form is known to be an NP-hard problem. Efficient solutions, including in the case of large numbers of clients, are described in D. Feldman, S. Gil, R. Knepper, B. Julian, and D. Rus. "K-robots clustering of moving sensors using coresets", in *ICRA*, 2013, and in S. Gil, D. Feldman, and D. Rus. "Communication coverage for independently moving robots," in *IROS*, 2012, which are incorporated herein by reference.

Note that an alternative to solving equation (1) in an optimal manner, a gradient approach may be used in which the gradient of the term in the brackets { } is computed with respect to each $c_i$, and the routers are then moved in the most negative gradient direction.

Figure 3:
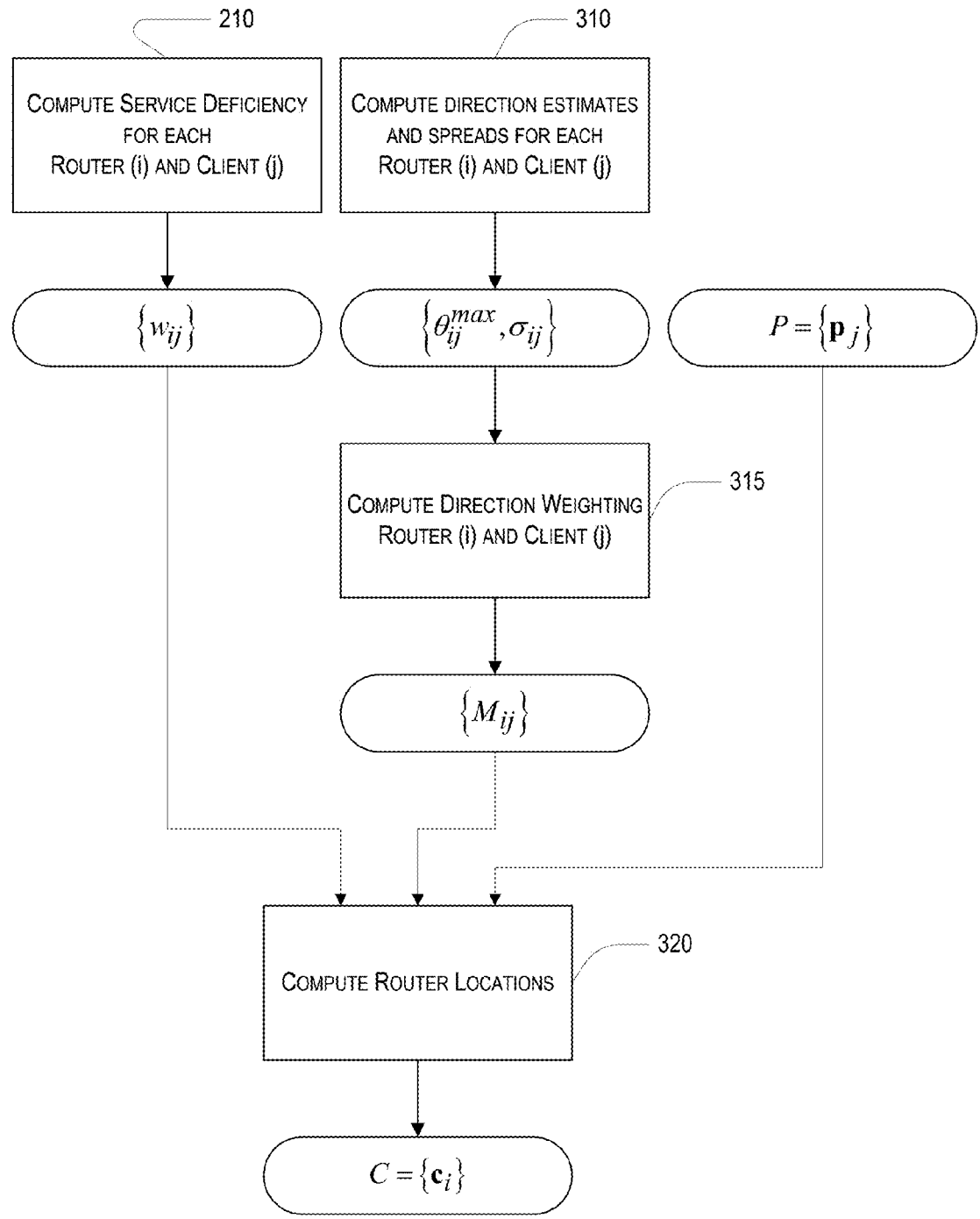

Referring to FIG. 3, second approach uses the spread/certainties $j^{th}$ of the estimated directions in a direction profile computation 310, in order to compute (d×d) weighting matrices determined in a direction weighting computation 320 and then computing the updated router locations using a modified form of the computation 220 of FIG. 2 as a location computation 320:

$$C^* = \arg\min_C \{\max_{p_j \in P(t)} \min_{c_i \in C} (w_{ij}^2 (p_j - c_i)^T M_{ij} (p_j - c_i))\} \quad (2)$$

Figure 4:
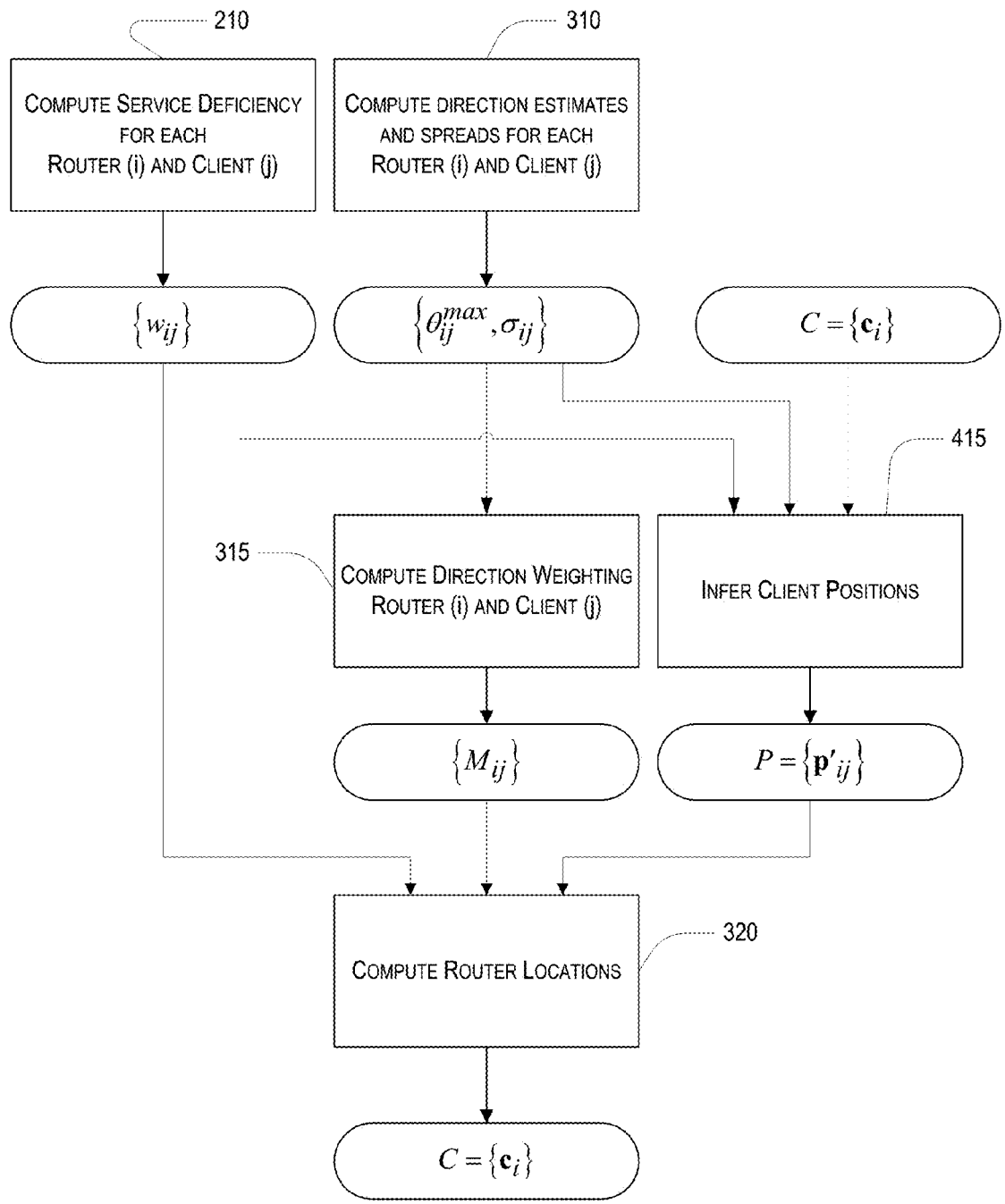

Referring to FIG. 4, a third approach shares much of the computation of the second approach shown in FIG. 3. In this approach, each router $C = \arg\min_C \{\max_{p_j \in P(T)} \min_{c_i \in C} (w_{ij}^2 (p_j - c_i)^T M_{ij} (p_j - c_i))\}$ infers locations of each of the clients j in a client position inference computation 415, with the inferred locations represented as $p'_{ij}$, which is an estimated or proxy location of client j from the perspective of router i, in some embodiments determined from $f_{ij}$ and $w_{ij}$.

The updated locations are then determined using the router location computation 320 (as in FIG. 3) as $$C^* = \arg\min_C \{\max_{j \in [1, \ldots, L]} \min_{c_i \in C} (w_{ij}^2 (p'_{ij} - c_i)^T M_{ij} (p'_{ij} - c_i))\} \quad (3)$$

As introduced above, the second and the third approaches make used of direction spread/certainties $\rho_{ij}$, and in the case of the third approach, also make use of the direction estimates $\theta_{ij}^{max}$.

As introduced above, alternative versions of these three approaches make use of computation of the gradient of the bracketed term $\nabla_{c_i} \{ \}$ and directing the router i in the most negative gradient direction. In the case of the approach corresponding to equation (2), the most negative gradient direction for a router i will result in $$c^*_i = c_i(t) + \alpha 2 w_{ij} M_{ij} (p_j - c_i(t))$$

for a particular client j, and an optional positive value $\alpha$, which determines a length of the position updates of the routers.

A number of approaches for computing a direction profile $f_{ij}(\theta)$ for a particular router-client (i, j) pair, for use in determining C* at time t make use of multiple transmissions between that router-client pair prior to time t. In some such embodiments, these transmissions occur during the travel of router from location $c_i(t - \Delta t)$ to location $c_i(t)$. In general, the system determines complex channel estimates $h_{ij}(t)$ (i.e., representing magnitude and phase) at an increasing sequence to times $t_0 = t - \Delta t, t_1, t_2, \ldots, t_m = t$ (which are in general different for each (i, j) pair). Using an approach described in detail in International (PCT) Patent Pub. WO2015/100237, titled "LOCALIZATION WITH NON-SYNCHRONOUS EMISSION AND MULTIPATH TRANSMISSION," the direction profile is formed as $$f(\theta + \theta_i) = \left| \sum_{\tau = t_0, \ldots, t_m} h(\tau) e^{-j \frac{2\pi}{\lambda} d(\tau) \cos \theta} \right|^2, \quad (4)$$

where assuming that the path from $c_i(t - \Delta t)$ to $c_i(t)$ is a straight line at an absolute angle $\theta_i = \angle(c_i(t) - c_i(t - \Delta t))$, $d(\tau)$ is the scalar distance along that line. Note that it is not essential that the router travel in a straight line, and vector displacements $\vec{d}(\tau)$ can be used instead of scalar displacements in an expression $\vec{d}(\tau) \cdot \hat{v}_\theta$ instead of $d(\tau) \cos(\theta)$, where $\hat{v}_\theta$ is a unit vector in the $\theta$ direction. Also note that in situations in which the router has multiple antennas (e.g., for a Multiple-Input Multiple-Output, MIMO, communication approach), each antenna contributes separately to the direction profile.

As introduced in Patent Pub. WO2015/100237, the routers and clients are independent in that they have local oscillators that, in general, exhibit frequency offsets. Unfortunately, even a small offset $\Delta_f$ in the frequency of the oscillators introduces a time varying phase to the wireless channel. For instance, let $h(t_0), h(t_1), \ldots, h(t_m)$ be the actual wireless channel from the robotic client to the robotic router at times $t_0, t_1, \ldots, t_m$. The channel observed by the router (to with a constant unit magnitude term) from its client $\hat{h}(t_0)$, $\hat{h}(t_1), \ldots, \hat{h}(t_m)$ are given by:

$$\hat{h}(t_0)=h(t_0), \hat{h}(t_1)=h(t_1)e^{-2\pi\Delta f(t_1-t_0)}, \ldots, \hat{h}(t_m)=h(t_m)e^{-2\pi\Delta f(t_m-t_0)}.$$

One approach to addressing this time-varying phase is presented in Patent Pub. WO2015/100237 through the use of a stationary antenna in conjunctions with a moving antenna, each demodulated by a same local oscillator. In the use cases introduced above, in general, a moving router cannot take advantage of such a stationary antenna. Note that in general, the phase offsets will not be precisely the result of a constant frequency difference $\Delta f$, and the terms $2\pi\Delta f(t_m-t_0)$ are replaced with $\phi_m$ without any change in the procedure.

In another approach to addressing the time varying phase is rather than having a fixed antenna, each router has a rotating antenna, and a fixed antenna that is maintained in a fixed relative position to center of rotation of the rotating antenna. In the case that the relative position is in or fixed relative to the direction of travel of the router, then the prior approach can be used directly. Similarly, two or more moving antennas on the router (e.g., two rotating antennas 180 degrees offset in rotation) can be used to acquire transmissions from the clients to determine directional information while compensating for frequency and phase offset between the router and the clients.

Direct application of the techniques presented in WO2015/100237 that use moving antennas on the routers may increase the complexity, cost, weight, etc., of the router, and also do not directly take advantage of the motion the router itself. A new approach permits the router to have a single antenna (or multiple antennas is a configuration that has a relatively fixed orientation) and to take advantage of the motion of the router itself, while also addressing the frequency (and phase) offsets described above. It should be understood that although this approach is particularly applicable to the case of controlling mobile routers as described herein, the approach has much wider applicability, for example, to situations described in Patent Pub. WO2015/100237, including in situations that address multipath and identification of most direct directions of arrival.

Figure 5:
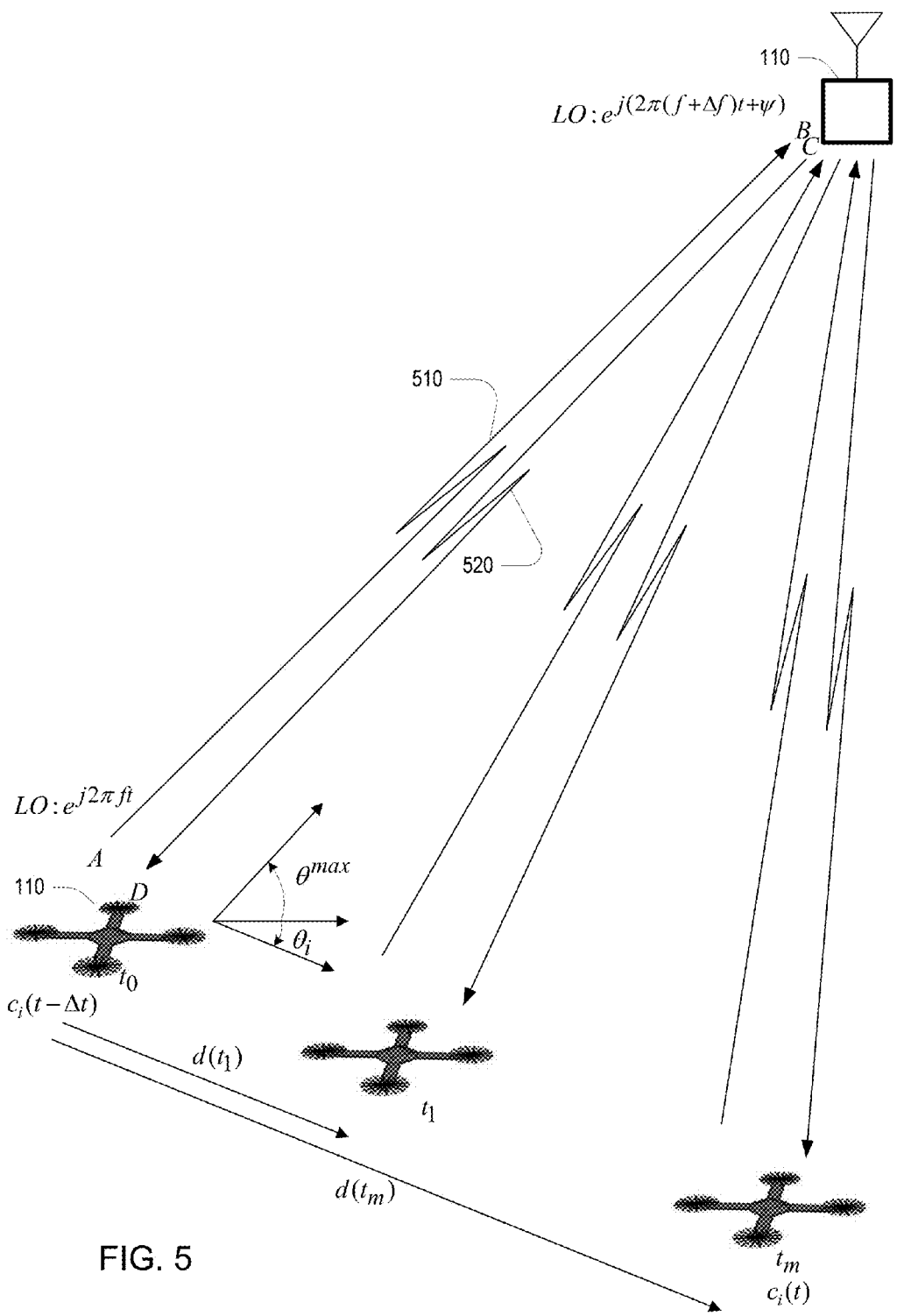
FIG. 5 is a diagram illustrating channel acquisition during travel of a router.

Referring to FIG. 5, in an example of one update period for one router 110 moving in a direction $\theta_i$ and one client 120, the router and client have m transmission exchanges, as introduced above. In this example, at each time $t_i$, the router makes a transmission 510 to the client, and the client replies with a transmission 520, for example, in the form of an acknowledgment of the transmission from the router. The client performs a channel estimation of the channel from the router to the client, for example, based on a known complex signal A being modulated than transmitted to the client where it is received and demodulated as a complex signal B. The channel from the router to the client is estimated by the client to be h=B/A. Similarly, the transmission 520 from the client to the router, the client sends a known signal C, which is demodulated as D, with the router estimating the reverse channel as $h_r$=D/C. Although the magnitude of these channels may differ, for example, because of different signal powers emitted by the router and by the client, one would expect that the phases would be the same, or at least differ by a constant that depends on the transmit and receive chains. However, the local oscillators (LOs) of the router and client are not assumed synchronized. In this example, we assume that the LO of the router 110 generates as signal $$e^{j2\pi ft}$$

while the LO of the client generates a signal $$e^{j(2\pi(f+\Delta f)t+\psi)}$$

for a frequency offset $\Delta f$, and a phase offset $\psi$, which is not assume constant between the pairs of transmissions 510-520.

Figure 6A:
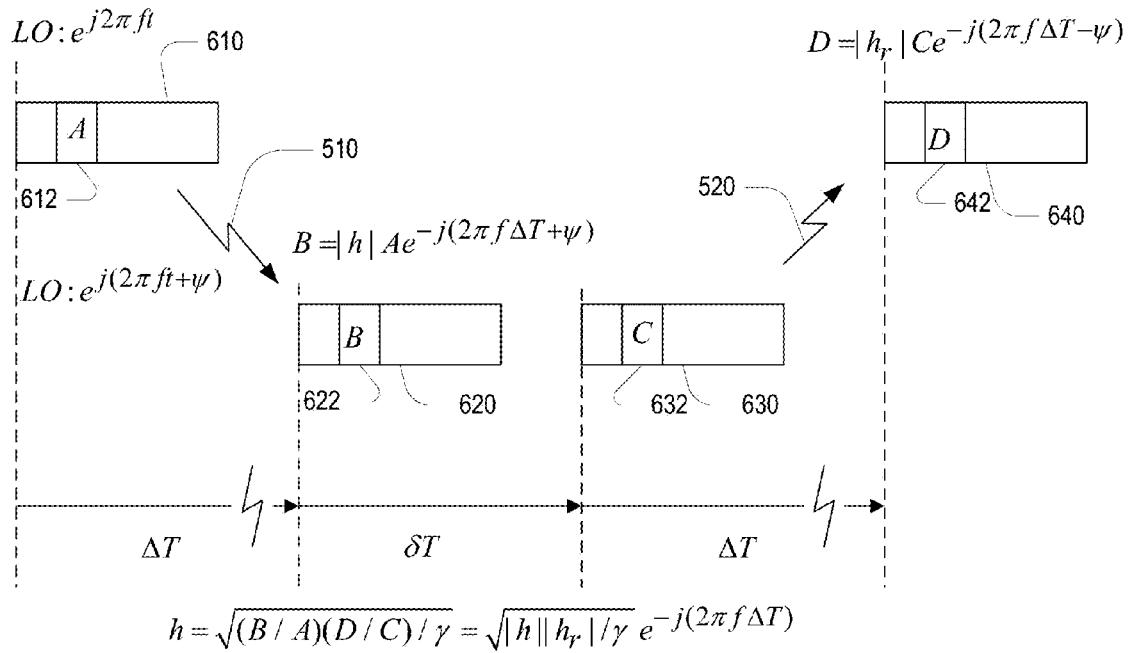
FIGS. 6A-B are timing diagrams illustrating channel estimation using reciprocity.

Referring to FIG. 6A, in the case of assuming that there is only an unknown phase $\psi \neq 0$ but no frequency offset so that $\Delta f=0$, a packet 610 with the known signal A 612 (e.g., a "pilot tone") is received as packet 620 and demodulated as a signal B 622 as $$B=|h_f|Ae^{-j(2\pi f\Delta T+\psi)}=|h_f|Ae^{-j2\pi f\Delta T}e^{-j\psi}$$

where $|h_f|$ is the magnitude of the channel, and $\Delta T$ is the propagation time between the router 110 and the client 120. Therefore, the client estimates the channel from the router to the client as $$h_f=|h_f|e^{-j2\pi f\Delta T}e^{-\psi}$$

which as can be seen differs from a desired channel estimate by $e^{-j\psi}$.

Within a fixed (or alternatively known) time $\delta t$, client sends a packet 630, with a known signal C 632, to the router, which receives it as packet 640, and demodulates the received symbol D 642. We assume in this example, that the client 120 communicates its estimate $h_f$ or one or more quantities that permit the router to compute $h_f$ (e.g., by transmitting B or a function of B). The router then makes an estimate of the reverse channel as $$h_r=|h_r|e^{-j2\pi f\Delta T}e^{+j\psi}$$

which as can be seen differs from a desired channel estimate by $e^{+j\psi}$.

In this example, the router uses the computed reverse channel, and an assumption that $|h_r|=\gamma|h_f|$ and the client's estimate of $h_f$ to compute a channel estimate as $$h=\sqrt{h_f h_r/\gamma}=\sqrt{(B/A)(D/C)/\gamma}=\sqrt{|h_f||h_r|/\gamma}e^{-j2\pi f\Delta T}$$

This channel estimate is used as h(t) in the sum of the m terms to form $f(\theta)$ as set forth above (see equation (4)). For simplicity, the quantity $\gamma$ is dropped (or assumed equal to 1) because it does not enter into further computations.

Figure 6B:
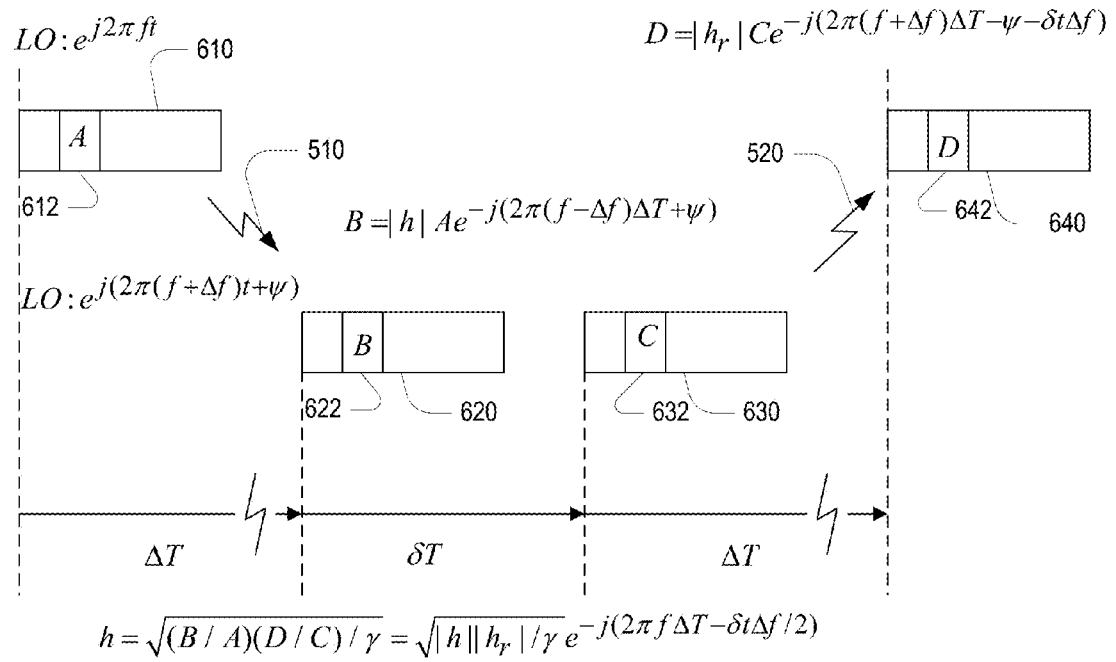

Referring to FIG. 6B, if we assume that there is not only a phase difference but also a frequency offset $\Delta f$, then as illustrated, computation of the channel at the router yields an estimate that is similar, with an addition of a phase term that depends on the time between receiving of the packet 620 and transmission of the return packet 630, as $$h=\sqrt{h_f h_r/\gamma}=\sqrt{(B/A)(D/C)/\gamma}=\sqrt{|h_f||h_r|/\gamma}e^{-j2\pi f\Delta T}e^{+\delta t\Delta f/2}$$

This channel estimate is used as h(t) in the sum of the m terms to form $f(\theta)$ as set forth above (see equation (4)). To the extent that $\delta t$ and $\Delta f$ are relatively constant over the m exchanges between the router and the client, this phase term does not affect the resulting directional profile $f(\theta)$.

As an alternative to computing $f(\theta)$ as described above, a "squared" version can be computed as $$f(\theta+\theta_i) = \left| \sum_{\tau=t_0,\ldots,t_m} h^2(\tau)e^{-j\frac{4\pi}{\lambda}d(\tau)\cos\theta} \right|^2, \qquad (5)$$

thereby avoiding the necessity of computing the square root above.

In some implementations, the profile $f(\theta)$ is evaluated only at a representative set of D directions (e.g., $\theta_k = 2\pi k/D$) by accumulating the complex sums at each of these directions, and after the m transmissions, determining the D magnitudes.

It should be understood that this way of using reciprocity is only one example. For instance, using m interchanges between a router and a client, the client may send C=B and the router the uses $\sqrt{D/A}$ to compute the estimated channel. In other examples, a router does not necessarily have to have a direct interchange with a client to estimate the channel using reciprocity. For example, a second router may overhear the transmission of C (i.e., receiving D') and knowledge (e.g., prior knowledge, or by receiving them from the first router) of the quantities A, B, C, D as well as an exchange of messages with the first router to determine a phase correction for a channel estimated using D'/C.

Figure 7:
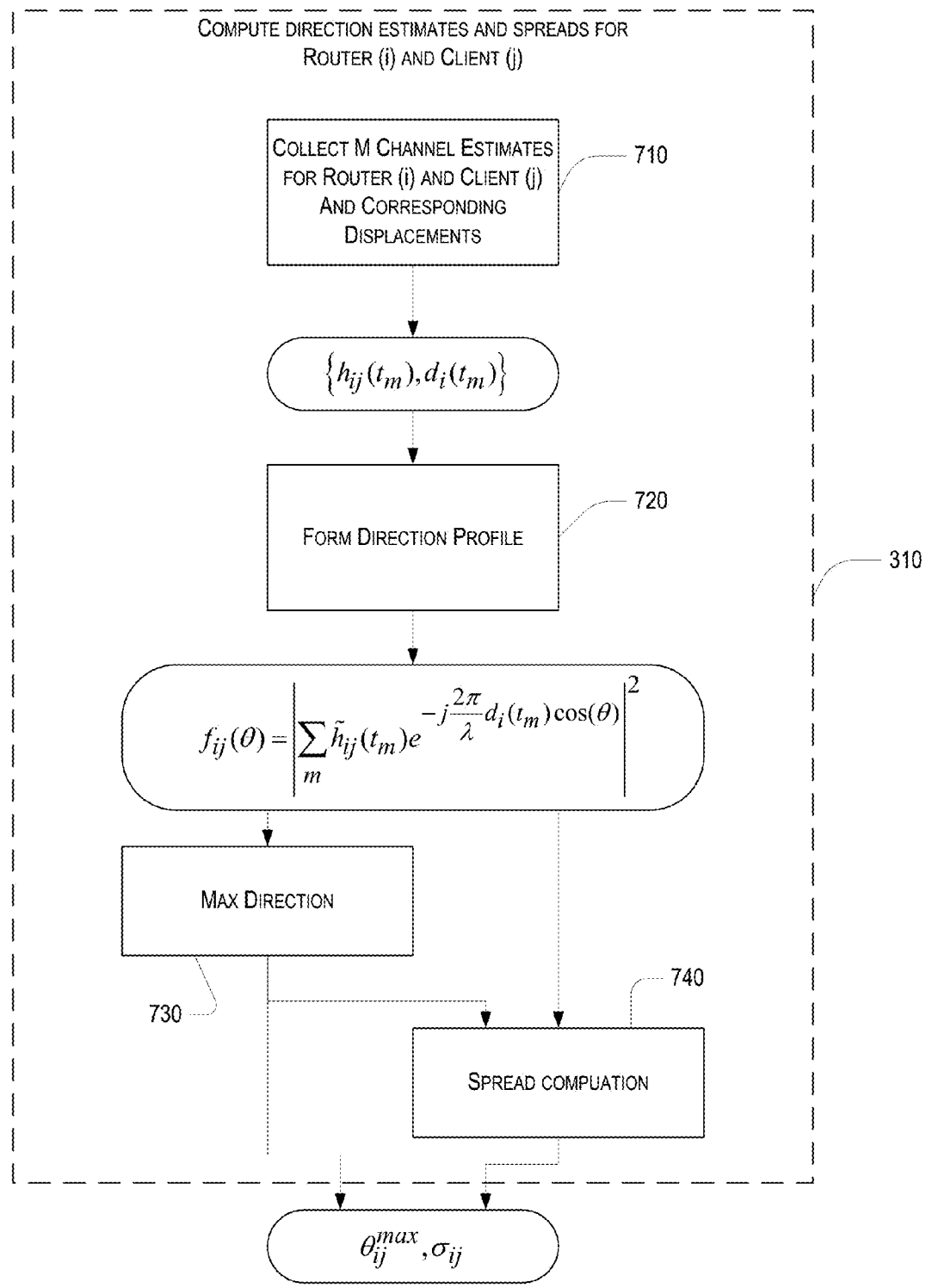
FIG. 7 is a flowchart illustrating an approach to estimating direction and direction spread.

As introduced above, for example as illustrated in FIGS. 3 and 4, for each router-client pair (or at least a subset of pairs that are in communication with each other—the other pairs are assumed to be inaccessible to one another) a direction and spread/certainty of the direction from the router to the client is determined in a direction computation 310. Referring to FIG. 7, and implementation of this computation is described in more detail.

As discussed above, each router i and for a number of clients j, the router collects channel estimates $h_{ij}$ at a number of points along its trajectory. For a particular (i, j) pair, the router collects m channel estimates $h_{ij}$ at corresponding distances $d_i$ along its trajectory, for example, as illustrated in FIG. 5. The channel estimates are used for form a direction profile. In some embodiments, the approach described above is used to compute $f_{ij}(\theta)$ at a discretized set of angles.

In the implementation shown in FIG. 7, each direction profile evaluated to determining the maximum power direction in a direction computation 730. In one embodiment, this direction, referred to as $\theta^{max}$ is the angle at which $f(\theta)$ reaches its maximum. It should be understood that there are alternative ways of determining this maximum direction. For example, $f(\theta)$ may be normalized to form a circular distribution, and the first order moment of the distribution use to determine the maximum direction. As another alternative, the direction may be selected as a local maximum of the direction profile, and a most direct path may be selected by identifying maxima associated with indirect (i.e., reflected) paths using techniques described in WO2015/100237.

Each profile is also evaluated to determine a quantity characterizing a spread or certainty of the determined maximum direction, with is denoted using the variable $\sigma$. One approach to computing this quantity uses the following sequence of calculations:

$$1) \tilde{f}(\theta) = (1/F)f(\theta) \text{ where } F = \int_\theta f(\theta)d\theta$$

$$2) \sigma = \int_\theta (\theta - \theta^{max})^2 \tilde{f}(\theta)d\theta \Big/ \frac{1}{2\pi}\int_\theta (\theta - \theta^{max})^2 d\theta$$

Alternative to the continuous integration, equivalent discretized summations may be used. Note that $\sigma$ can range from close to zero for a direction profile with a single very sharp peak, to one for a uniform direction profile, to quantities greater than one for example, in the case of multiple peaks (e.g., as a result of multi paths).

There are alternative approaches to computing the spread or certainty. For example, a second moment of $\tilde{f}(\theta)$, a circular distribution, can be used. Other alternatives may consider the "mass" for the direction profile in the vicinity of the maximum direction, or equivalent percentile ranges.

As introduced above, in some embodiments, the spread quantities $\sigma$ are used to form weighted distances. Recall that in the first approach (i.e., equation (1)), a Euclidean distance between a router at location $c_i$ and a client a location $p_j$ is computed as $$\|c_i - p_j\|^2 = (c_i - p_j)^T(c_i - j)$$

while in the second and third approaches a weighted (Mahalanobis Distance) approach quantity $$(c_i - p_j)^T M_{ij} (c_i - p_i)$$

is used in place of the Euclidean distance.

One approach to computing M (omitting the ij subscript) uses $\theta^{max}$ and $\sigma$. A unit vector $\hat{v}^{max}$ is in the direction between the router and the client in the $(c_i - p_j)$ direction. A unit vector $\hat{v}_\perp^{max}$ is perpendicular to $\hat{v}^{max}$. The weighting matrix M is selected to not scale distances in directions perpendicular to $\hat{v}^{max}$, and to scale Euclidean distance by $1/\sigma^2$ in the $\hat{v}^{max}$ direction. This type of scaling is achieved with the computation $$M = Q\Lambda Q^T$$

where $$Q = [\hat{v}^{max}, \hat{v}_\perp^{max}] \text{ and } \Lambda = \text{diag}\left[\frac{1}{\sigma^2}, 1\right]$$

Note that if $\sigma=1$, no directional weighting is performed. When the direction profile is peaked and $\sigma<1$, the optimization preferably moves routers towards the such clients. When the direction profile is multi-peaked and $\sigma>1$, the optimization de-weights distances to those clients.

As introduced above, in the thirds approach, which is illustrated in FIG. 4, locations of clients are inferred in a computation block 415. One approach to such inference is performed separately at each router and makes use of the following vector computation:

$$p'_{ij} = c_i(t) + \gamma w_{ij} \hat{v}_{ij}^{max}$$

which is a point at a distance $\gamma w_{ij}$ away from the router in the maximum direction to the client. Recall that $w_{ij}$ is larger if there is a greater deficiency in the service to the client, and therefore the optimization will preferentially move the router toward that client. The constant $\gamma$ is chosen to be greater to cause greater changes in desired locations for the routers.

As introduced above, the approach can be implemented as a two-dimensional or a three-dimensional solution. Two-dimensional solutions are appropriate, for example, for a ground based situation for example, in locating robot-based routers in a factory with many obstructions and moving robot and/or human-based clients. Three-dimensional clients are appropriate, for example, in locating aerial routers to service ground-based or aerial clients. Although specific equations are presented, in general, for a two-dimensional implementation, analogous three-dimensional forms can be used. For example, as described in WO2015/100237, three-dimensional direction profiles, which depend on two scalar angular quantities, are formed. In the three-dimensional case, in some embodiments multiple antennas and/or non-linear (e.g., arced) trajectories are used to mitigate ambiguity in the maximum angle in the direction profile.

Figure 8:
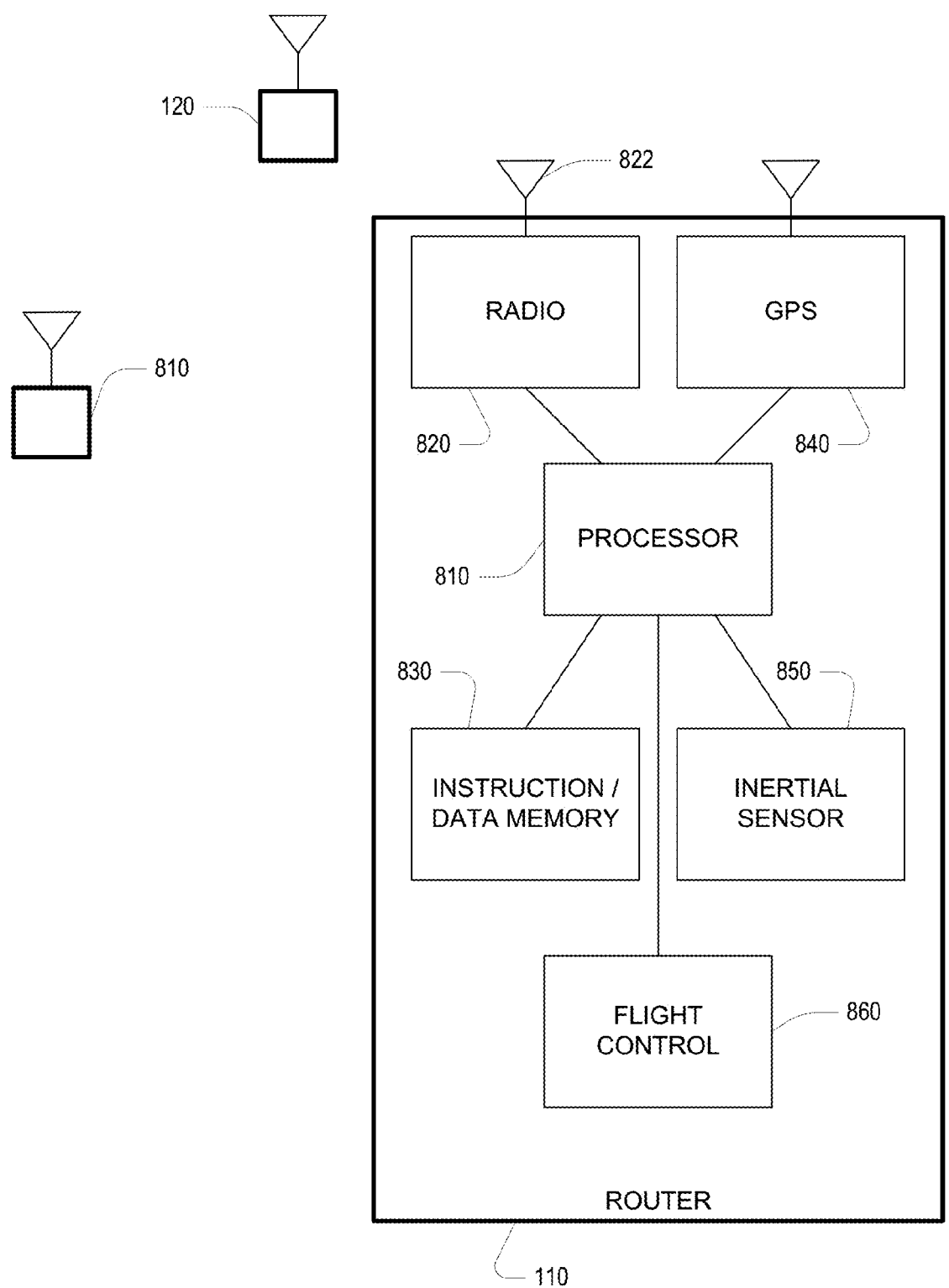
FIG. 8 is a block diagram of a router node.

Referring to FIG. 8, in an embodiment of a router, a processor 810 controls operation of the router executing instructions and using data in a memory 830. The router uses a radio 820 to communicate with the clients 120 and determines the directional information via the antenna 822 (or optionally via multiple antennas). The determination of the desired position may be performed at a central server 810, in communication with the router, or alternatively may be performed in whole or in part in a distributed manner using the processor in the router. As the router travels, its location is tracked, for example, by the processor accepting measurements from an inertial sensor 850 (e.g., accelerometers, gyroscope, etc.) and/or from a GPS receiver 840. In some examples, in addition to tracking clients, the routers track each other using the same or similar techniques as described above.

Implementations of the approaches described above may use software stored on machine-readable media. The software can include instructions for causing processors, for example, processors in the routers and in some embodiments in the client nodes. In some implementations, some of the processing, for example channel estimation using reciprocity, is implemented in a processor in a software-based radio. In some implementations, the router location updating is performed at a central server, while in other implementations, each router computes part of the router repositioning optimization in a distributed manner. Some embodiments implement at least part of the functions (e.g., channel estimation) in hardware, for example, using Application Specific Integrated Circuits (ASICs).

It is to be understood that the foregoing description is intended to illustrate and not to limit the scope of the invention, which is defined by the scope of the appended claims. Other embodiments are within the scope of the following claims.

What is claimed is:

1. A method for adaptively locating a set of mobile routers providing wireless communication services to a plurality of clients, the method comprising, at a first mobile router of the set of mobile routers:
   for each client of a set of clients of the plurality of clients that are in wireless communication with the first router,
      determining a direction profile characterizing direction-dependence of one or more signal paths between the first router and the client, and determining using the direction profile directional information comprising at least one of a communication direction between the router and the client and a spread of the direction profile,
      computing a deficiency in communication service associated with the client and the first router, and
      providing the directional information and the deficiency in communication for determining a location for the first router; and
   using the determined location for the first router to adapt the location of said router.

2. The method of claim 1 wherein adapting the location of the router comprises causing the router to travel toward the determined location.

3. The method of claim 1 performed at each mobile router of the set of mobile routers.

4. The method of claim 1 performed repeatedly at the first router.

5. The method of claim 1 further comprising determining the location for the first router.

6. The method of claim 5 further comprising determining locations for each router of the set of routers, including determining the location of the first router.

7. The method of claim 6 wherein determining the locations for each router of the set of routers comprises determining said locations according to a min-max cost for communication between the routers and the clients.

8. The method of claim 7 wherein the min-max cost depends on the spreads of the direction profiles.

9. The method of claim 7 comprising computing the locations of the routers using at least one of the following computations:

$$C^* = \arg\min_C \{\max_{p_j \in P(t)} \min_{c_i \in C}(w_{ij}^2 \|p_j - c_i\|^2)\},$$

$$C^* = \arg\min_C \{\max_{p_j \in P(t)} \min_{c_i \in C}(w_{ij}^2 (p_j - c_i)^T M_{ij}(p_j - c_i))\}, \text{ and}$$

$$C^* = \arg\min_C \{\max_{j \in [1, \ldots, L]} \min_{c_i \in C}(w_{ij}^2 (p'_{ij} - c_i)^T M_{ij}(p'_{ij} - c_i))\},$$

where $p_j$ is a location of a client j, $p'_{ij}$ is an estimate of a location of client $p'_{ij}$ from router i, $c_i$ is a location of a router i, $w_{ij}$ is a communication deficiency between router i and client j, and $M_{ij}$ represents a directions distance weighting.

10. The method of claim 1 wherein computing a deficiency in communication service includes determining a difference between a desired service and a provided service between the router and the client.

11. The method of claim 10 wherein the deficiency in communication between a router i and a client j is computed as $$w_{ij} = \max(\alpha_j(q_j - \rho_{ij})/q_j, 0)$$

where
   $q_j > 0$ represents the demanded service by the client j,
   $\rho_{ij} > 0$ represents the available service to the client j from the the router i, and
   $\alpha > 0$ is an importance of the client j.

12. The method of claim 1 wherein determining the direction profile between the router and the client comprises:
   exchanging one or more sets of transmissions between the router and the client, each set of transmissions including at least one transmission from the router to the client and a corresponding transmission from the router, each set of transmissions being associated with a corresponding location of the router;
   for each set of transmissions of the one or more sets of transmissions, determining at least a phase characteristic of a channel between the router an the client from that set of transmissions;
   combining the phase characteristics of the one or more sets of transmissions and the corresponding locations to determine the direction profile.

13. The method of claim 12 wherein each set of transmissions comprises at least a transmission sent from the router to the client and a transmission received at the router from the client.

14. The method of claim 13 wherein each set of transmissions comprises a transmission providing an estimate of a channel phase of the transmission sent from the router to the client.

15. The method of claim 13 wherein determining the phase characteristic of the channel between the router and the client includes combining quantities characterizing an estimate of a channel phase of the transmission sent from the router to the client and a characterizing an estimate of a channel phase of the transmission received from the client at the router.

16. The method of claim 12 wherein combining the phase characteristics comprises computing a complex function $$\sum_{\tau=t_0,\ldots,t_m} h(\tau)e^{-j\frac{2\pi}{\lambda}d(\tau)\cos\theta}$$

for a set of distances $d(\tau)$ corresponding to the locations of the router and a set of complex channel estimates $h(\tau)$.

17. The method of claim 12 wherein combining the phase characteristics comprises applying a Synthetic Aperture Radar (SAR) technique.

18. A non-transitory machine-readable medium comprising instructions stored thereon, the instructions, when executed by one or more processors cause adaptive locating of a set of mobile routers providing wireless communication services to a plurality of clients, the instructions including first instructions that when executed on a processor of a first mobile router of the set of mobile routers cause the processor to perform a procedure including:
for each client of a set of clients of the plurality of clients that are in wireless communication with the first router, determining a direction profile characterizing direction-dependence of one or more signal paths between the first router and the client, and determining using the direction profile directional information comprising at least one of a communication direction between the router and the client and a spread of the direction profile,
computing a deficiency in communication service associated with the client and the first router, and
providing the directional information and the deficiency in communication for determining a location for the first router; and
using the determined location for the first router to adapt the location of said router.

19. The medium of claim 18 wherein execution of the procedure further causes the first router to travel toward the determined location.

20. The medium of claim 18 wherein the instructions include, instructions for execution of the procedure at processors of each mobile router of the set of mobile routers.

21. The medium of claim 18 wherein the instructions include instructions to perform the procedure repeatedly at the first router.

22. The medium of claim 18 wherein the procedure further comprises determining the location for the first router.

23. The medium of claim 22 the instructions further includes instructions when executed on the one or more processed cause said processors to determining locations for each router of the set of routers, including determining the location of the first router.

24. The medium of claim 23 wherein determining the locations for each router of the set of routers comprises determining said locations according to a min-max cost for communication between the routers and the clients.

25. The medium of claim 24 wherein the min-max cost depends on the spreads of the direction profiles.

26. The medium of claim 23 wherein determining the locations for each router of the set of routers comprises computing the locations of the routers using at least one of the following computations:

$$C^* = \arg\min_C\{\max_{p_j\in P(t)}\min_{c_i\in C}(w_{ij}^2\|p_j-c_i\|^2)\},$$

$$C^* = \arg\min_C\{\max_{p_j\in P(t)}\min_{c_i\in C}(w_{ij}^2(p_j-c_i)^T M_{ij}(p_j-c_i))\}, \text{ and}$$

$$C^* = \arg\min_C\{\max_{j\in[1,\ldots,L]}\min_{c_i\in C}(w_{ij}^2(p'_{ij}-c_i)^T M_{ij}(p'_{ij}-c_i))\},$$

where $p_j$ is a location of a client j, $p'_{ij}$ is an estimate of a location of client $p'_{ij}$ from router i, $c_i$ is a location of a router i, $w_{ij}$ is a communication deficiency between router i and client j, and represents a directions distance weighting.

27. The medium of claim 18 wherein computing a deficiency in communication service includes determining a difference between a desired service and a provided service between the router and the client.

28. The medium of claim 27 wherein the deficiency in communication between a router i and a client j is computed as $$w_{ij}=\max(\alpha_j(q_j-\rho_{ij})/q_j, 0)$$

where
$q_j>0$ represents the demanded service by the client j,
$\rho_{ij}>0$ represents the available service to the client j from the router i, and
$\alpha_j>0$ is an importance of the client j.

29. The medium of claim 28 wherein determining the direction profile between the router and the client comprises:
exchanging one or more sets of transmissions between the router and the client, each set of transmissions including at least one transmission from the router to the client and a corresponding transmission from the router, each set of transmissions being associated with a corresponding location of the router;
for each set of transmissions of the one or more sets of transmissions, determining at least a phase characteristic of a channel between the router an the client from that set of transmissions;
combining the phase characteristics of the one or more sets of transmissions and the corresponding locations to determine the direction profile.

30. The medium of claim 29 wherein each set of transmissions comprises at least a transmission sent from the router to the client and a transmission received at the router from the client.

31. The medium of claim 30 wherein each set of transmissions comprises a transmission providing an estimate of a channel phase of the transmission sent from the router to the client.

32. The medium of claim 30 wherein determining the phase characteristic of the channel between the router and the client includes combining quantities characterizing an estimate of a channel phase of the transmission sent from the router to the client and a characterizing an estimate of a channel phase of the transmission received from the client at the router.

33. The medium of claim 29 wherein combining the phase characteristics comprises computing a complex function $$\sum_{\tau=t_0,\ldots,t_m} h(\tau)e^{-j\frac{2\pi}{\lambda}d(\tau)\cos\theta}$$

for a set of distances $d(\tau)$ corresponding to the locations of the router and a set of complex channel estimates $h(\tau)$.

34. The medium of claim 29 wherein combining the phase characteristics comprises applying a Synthetic Aperture Radar (SAR) technique.

35. A communication system comprising a first mobile router that includes a controller configured to perform a procedure comprising
- for each client of a set of clients of a plurality of clients that are in wireless communication with the first mobile router,
  - determining a direction profile characterizing direction-dependence of one or more signal paths between the mobile router and the client, and determining using the direction profile directional information comprising at least one of a communication direction between the first mobile router and the client and a spread of the direction profile,
  - computing a deficiency in communication service associated with the client and the first mobile router, and
  - providing the directional information and the deficiency in communication for determining a location for the first mobile router; and
- using the determined location for the first router to adapt the location of said router.

36. The communication system of claim 35 comprising a plurality of mobile routers, each comprising a controller configured to perform the procedure.

37. The communication system of claim 35 wherein the controller comprises a processor and a storage for instructions, execution of the instructions causing the processor to perform the procedure.

* * * * *